United States Patent

[11] 3,610,710

[72] Inventor John E. Dandl
211 West 16th St., Chico, Calif. 95926
[21] Appl. No. 886,852
[22] Filed Dec. 22, 1969
[45] Patented Oct. 5, 1971

[54] ADJUSTABLE SIDE MEMBER FOR PENDULUM MOUNTED BEARING STRUCTURE
3 Claims, 2 Drawing Figs.
[52] U.S. Cl. .................................................. 308/32, 308/184
[51] Int. Cl. .................................................. F16c 27/00
[50] Field of Search .......................................... 308/32, 26, 33, 15, 184

[56] References Cited
UNITED STATES PATENTS
2,310,282  2/1943  Gauss ........................... 308/33
2,321,329  6/1943  Stafford et al. ............... 308/32

Primary Examiner—Edgar W. Geoghegan
Assistant Examiner—Frank Susko
Attorney—Robert Charles Hill ABSTRACT: A pendulum mounted bearing structure is provided with an adjustable side member. The side member adjusts both horizontally and vertically relative to the bearing structure. A resilient member within the side member absorbs vibration.

PATENTED OCT 5 1971 3,610,710

INVENTOR.
JOHN E. DANDL
BY Robert Charles Hill
ATTORNEY

ADJUSTABLE SIDE MEMBER FOR PENDULUM MOUNTED BEARING STRUCTURE

BACKGROUND OF THE INVENTION

An adjustable side member is secured to a pendulum mounted bearing structure. Vibrations of the bearing structure are absorbed by the side member.

SUMMARY OF THE INVENTION

The present invention relates to a pendulum mounted self-balancing bearing structure in combination with an adjustable side member.

Certain machinery and in particular farm machinery make use of high-speed rotational shafts which support reellike members which in turn extend to distances of 8 to 10 and even 15 feet. Examples of such usage are found in farm mowers, beet cutters, rice choppers, and the like. All of these pieces of equipment require shaft rotation of over 2,000 r.p.m. to bring about effective cutting by the knives which are attached to the reel member. In such operations, the supports for the shaft must bear the weight of the shaft as well as allow the shaft some freedom to change its center of rotation so that the shaft can become a truly self-balancing member during rotation. Such a self-balancing member eliminates torsional vibrations and the out of balance effect caused by the shaft or reel losing a knife or picking up of a foreign object.

One major problem encountered in the above-described equipment is that with most of the various types of mountings employed at the present time, the shafts cannot maintain their own rotational center of gravity. Thus, once a high-speed rotational shaft gets out of alignment, it continues in such position and gradually becomes further out of line until the vibrations render the machine inoperative. Thus, uneven loads on the rotating shaft create a side torque effect which if not corrected lead to dire results.

The present invention is based on the discovery that an adjustable side member attached to the pendulum mounted bearing structure changes the torque characteristics of the rotating shaft for allowing the shaft to seek its own rotational center of gravity.

It is the primary object of the present invention to provide a new and improved pendulum mounted self-balancing bearing structure.

Another object is to provide a pendulum mounted self-balancing bearing structure with a side member which can be adjusted both vertically and horizontally relative to the bearing structure.

A further object of the invention is to provide structure of the character described which is economical to produce, reliable in operation, and long lasting in usage.

DESCRIPTION OF THE PREFERRED EMBODIMENT

Figure 1:
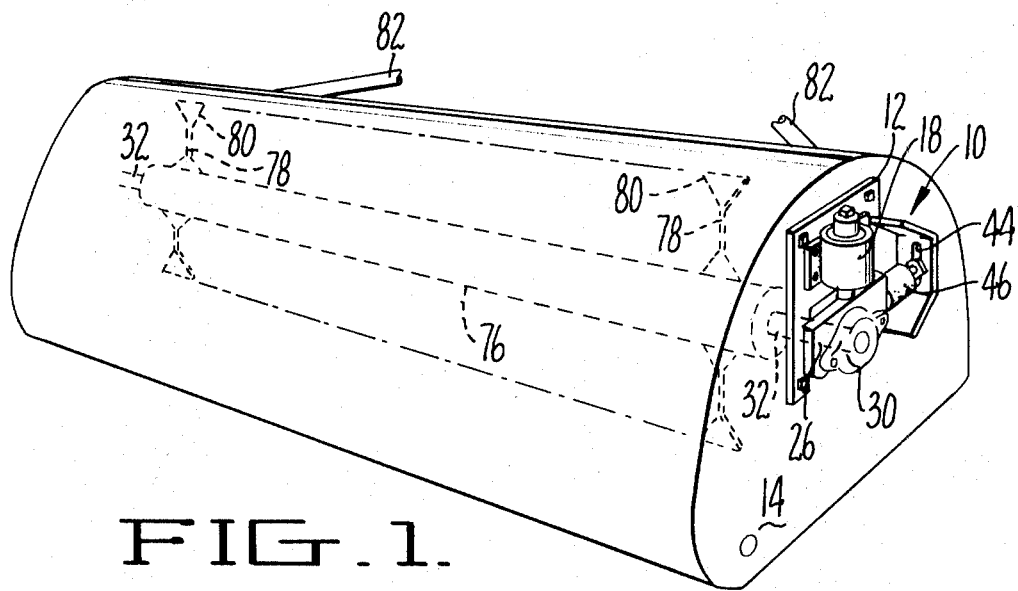
FIG. 1 is a perspective view partially in dotted outline illustrating a structure embodying the features of the present invention.

Referring to FIG. 1 of the drawing, there is shown the pendulum mounted self-balancing bearing of this invention, generally indicated 10, which is adaptable for use on many implements where high-shaft speeds are encountered, such as on rice cutters, flail mowers and the like.

Figure 2:
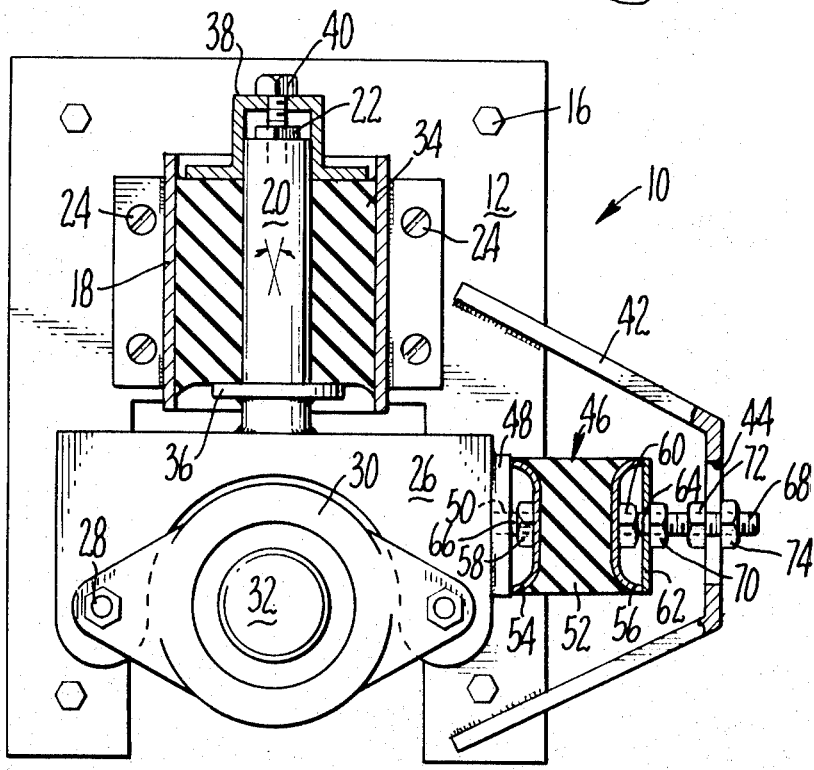
FIG. 2 is a side view partially in section.

Looking particularly at FIG. 2, there is shown a mounting plate 12 which is secured to sideplate 14 (FIG. 1) of a cutter or mower by bolts 16. The mounting plate 12 has a circular housing barrel 18 attached to it by bolts 24.

Extending through the housing barrel 18 is a pendulum member 20. The top of the pendulum member 20 has a threaded supporting nut 22 and the bottom of the pendulum member 20 is connected by welding or the like to bearing carrier member 26.

Attached to bearing carrier member 26 by bolts 28 is a standard two hole flange bearing 30 within which is journaled shaft 32. Shock absorbing member 34 is inserted into the housing barrel 18 and by means of member 36 is retained therein and completely encircles the pendulum member 20. A flange member 38 fits within the housing barrel 18 and utilizes main support bolt 40 to threadably connect with supporting nut 22 to provide the sole source of support for the pendulum member 20. Flange member 38 rests on the shock absorbing member 34 and has about ¼-inch diameter clearance with the housing barrel 18.

Thus it can be seen that flange member 38 and the shock absorbing member 34 limit the lateral movement of the pendulum member 20. The various movements of the pendulum member 20 are illustrated by the arrows and angles of FIG. 2.

Mounting bracket 42 having slot 44 (FIG. 1) therein is secured to mounting plate 12 by welding or the like. Intermediate the mounting bracket 42 and the bearing carrier member 26 is a side member, generally indicated 46. A mounting pad 48 having threaded aperture 50 therein is secured to the bearing carrier member 26 by welding or the like.

The side member 46 has a resilient member 52, metallic cups 54 and 56 bonded to the resilient member 52 at each end, nuts 58 and 60 welded to the metallic cups 54 and 56, respectively, washer 62 having aperture 64 therein secured to metallic cup 56, and inner stud 66 and outer stud 68.

To properly position the side member 46, the inner stud 66 is first threaded into nut 58 and then threaded into mounting pad threaded aperture 50 by turning the side member until metallic cup 54 is close to or flush with mounting pad 48. The outer stud 68 is then threaded into nut 60 and nut 70 is rotated on stud 68 until it presses against washer 62 and locks the washer 62 and the stud 68. Horizontal adjustment of the side member 46 relative to the bearing carrier member 26 is accomplished by the rotation of nuts 72 and 74. Rotating nut 72 and then nut 74 toward the adjustable member 46 increases the force on the resilient member 52 while rotating nut 74 and then nut 72 decreases the force on the resilient member 52.

The vertical adjustment of the side member 46 relative to the bearing carrier member 26 is accomplished by having outer stud 68 extend through mounting bracket slot 44 and by providing nuts 72 and 74 on the outer stud 68 and on each side of slot 44. Tightening the nuts 72 and 74 toward each other and against slot 44 jams the outer stud 68 so that it cannot be turned and positions the outer stud 68 in any desired location within the slot 44.

A typical installation for the pendulum mounting self-balancing bearing 10 of the present invention is shown in FIG. 1 wherein the shafts 32 support a reel tube 76. A chain 78 connects knife member 80 to the reel 76. Rotation of the shafts 32 by conventional belt or chain drives in turn rotates the reel tube 76 thereby imparting a centrifugal cutting force to the knife member 80. Attaching bars 82 connect the cutter or mower to a tractor or the like.

a. of 60 duro hardness has been found satisfactory in operation for the shock absorbing member 34 and the resilient member 52 but rubber of other hardness can be used depending upon the severity of the application. The duro hardness of the resilient member 52 has to be such that it is capable of absorbing vibration.

Thus, it can be seen that the present invention by means of the adjustable side member 46 counteracts the side torque forces which may be created by the pulling action of the knife members 80 or the chain or belt means for rotating the shaft 32 while still allowing the shaft 32 to seek its own rotational center of gravity by means of the pendulum mounting.

I claim:

1. In a machine which allows a drive shaft to seek its own rotational center of gravity, the improvement comprising:
   a. a resilient pendulum mounted self-balancing bearing structure;
   b. a side member attached to said self-balancing bearing structure;

c. means for adjusting said side member relative to said bearing structure; and
d. resilient means within said side member for absorbing vertical and horizontal vibrations of said bearing structure.

2. The structure of claim 1 wherein the side member adjusting means allows for both vertical and horizontal adjustment relative to said bearing structure.

3. A pendulum mounted bearing in combination with an adjustable side member comprising:
 a. a shaft;
 b. a bearing member retained on said shaft;
 c. a bearing carrier member secured to said bearing member;
 d. a mounting plate;
 e. a housing barrel attached to said mounting plate;
 f. a pendulum member extending through said housing barrel and secured at one end to said bearing carrier member;
 g. at least one shock absorbing member within said housing barrel;
 h. a flange member resting of said shock absorbing member within said barrel housing and fastened to the other end of said pendulum member;
 i. a mounting bracket secured to said mounting plate;
 j. a side member intermediate said bearing carrier member and said mounting bracket;
 k. means for adjusting said side member relative to said bearing carrier member, and
 l. a resilient member within said side member capable of absorbing vibration.

UNITED STATES PATENT OFFICE
CERTIFICATE OF CORRECTION

Patent No. 3,610,710     Dated October 5, 1971

Inventor(s) John E. Dandl

It is certified that error appears in the above-identified patent and that said Letters Patent are hereby corrected as shown below:

Column 2, line 57, "a." should read -- Rubber --.

Signed and sealed this 29th day of August 1972.

(SEAL)
Attest:

EDWARD M. FLETCHER, JR.　　　　　　　　ROBERT GOTTSCHALK
Attesting Officer　　　　　　　　　　　Commissioner of Patents